(12) United States Patent
Groos et al.

(10) Patent No.: US 6,951,908 B2
(45) Date of Patent: Oct. 4, 2005

(54) DEVICE FOR FEEDING REACTOR INITIATORS

(75) Inventors: Georg Groos, Dannstadt-Schauernheim (DE); Frank-Olaf Mähling, Mannheim (DE); Andreas Daiss, Mannheim (DE); Dieter Littmann, Muecke (DE); Kaspar Evertz, Schifferstadt (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/433,404
(22) PCT Filed: Nov. 27, 2001
(86) PCT No.: PCT/EP01/13788
  § 371 (c)(1),
  (2), (4) Date: Jun. 20, 2003
(87) PCT Pub. No.: WO02/48214
  PCT Pub. Date: Jun. 20, 2002

(65) Prior Publication Data
  US 2004/0010098 A1 Jan. 15, 2004

(30) Foreign Application Priority Data
  Dec. 5, 2000 (DE) ................................. 100 60 372

(51) Int. Cl.$^7$ ................................................ C08F 2/02
(52) U.S. Cl. .................... 526/64; 526/352; 422/129; 422/132; 422/137
(58) Field of Search .................... 526/64, 352; 422/129, 422/132, 137

(56) References Cited

U.S. PATENT DOCUMENTS

| | | | |
|---|---|---|---|
| 3,405,115 A | 10/1968 | Schappert et al. | 260/94.9 |
| 4,135,044 A | 1/1979 | Beals | 526/64 |
| 4,175,169 A | 11/1979 | Beals et al. | 526/64 |
| 4,238,453 A | 12/1980 | Van den Bossche | 422/131 |
| 6,096,839 A | 8/2000 | Chinh et al. | 526/68 |

FOREIGN PATENT DOCUMENTS

| | | | |
|---|---|---|---|
| DE | 19634450 | 3/1998 | |
| DE | 19829399 | 2/2000 | |
| EP | 0449092 | 10/1991 | |
| EP | 0980967 | 2/2000 | |
| WO | 96/35506 | 11/1996 | |
| WO | WO 96/35506 | * 11/1996 | B01F/5/06 |

* cited by examiner

*Primary Examiner*—William K. Cheung
(74) *Attorney, Agent, or Firm*—Connolly Bove Lodge & Hutz LLP

(57) ABSTRACT

In a process for preparing polyethylene in tube reactors with or without autoclaves, where a free-radical initiator is introduced with or without cold ethylene into a flowing ethylene- and comonomer-containing medium, rotation is generated between two streams (61, 62) to be mixed at an angle (66) or by provision of a swirl element (20, 80) in the flow cross section (27, 28). In the region of a feed point (72, 81) for a free-radical initiator, there is provided a cross-sectional constriction (63, 67, 71) at which the free-radical initiator is introduced through an optimized off-center outlet opening (44) of an introduction finger (40) into the rotating flow (61, 62, 70).

20 Claims, 4 Drawing Sheets

FIG.6.1

Figure 1:
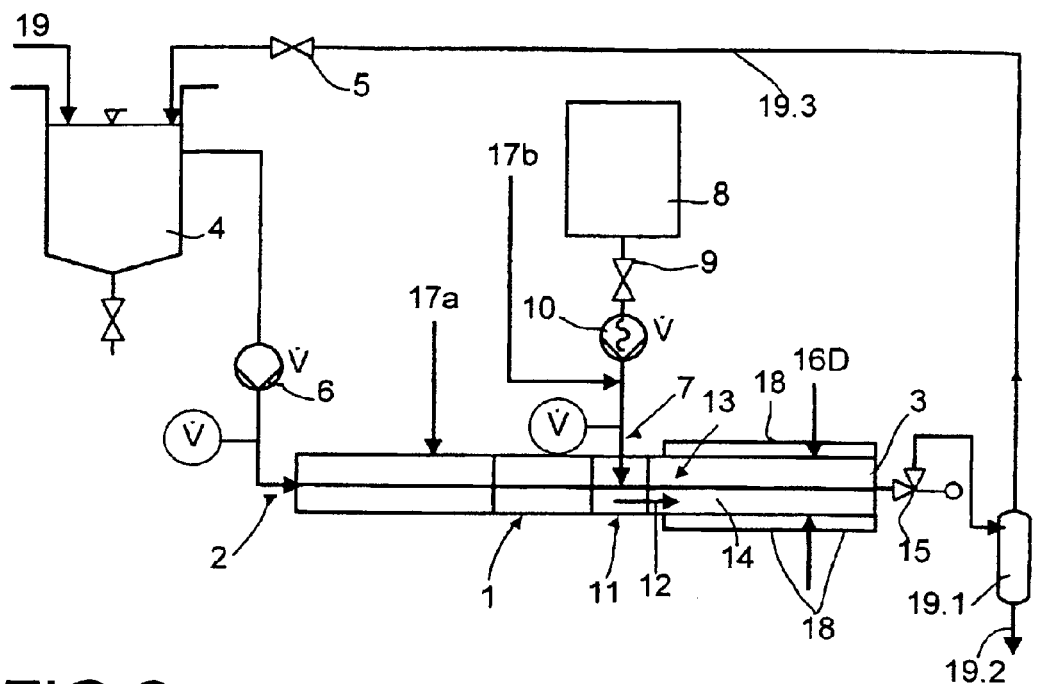

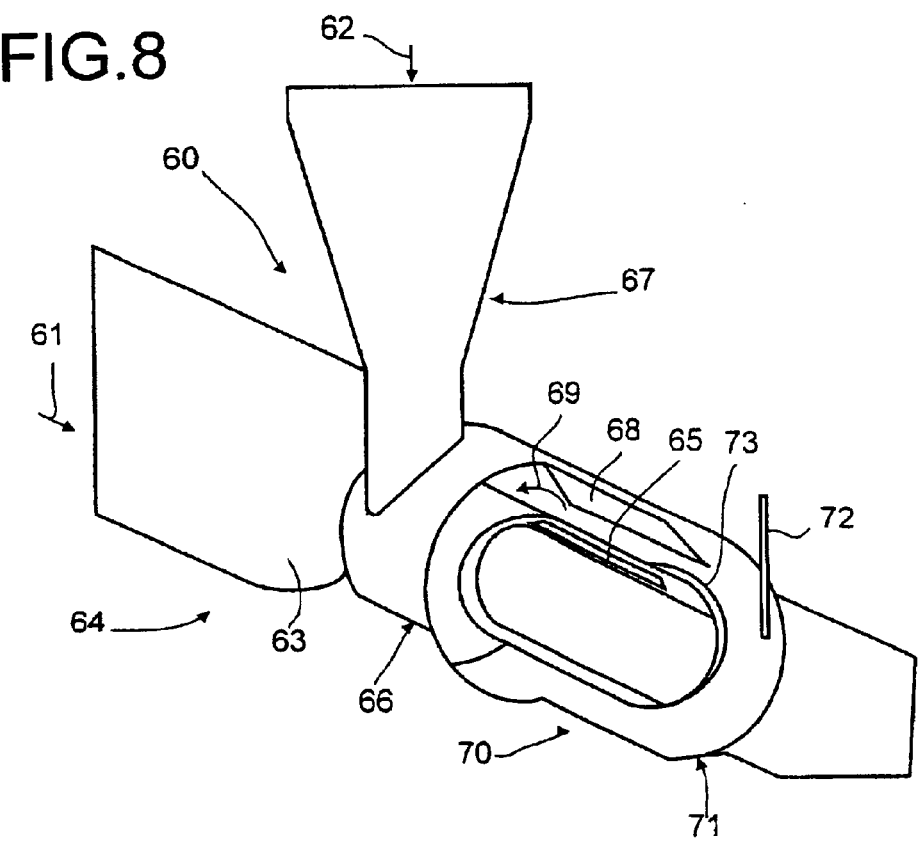
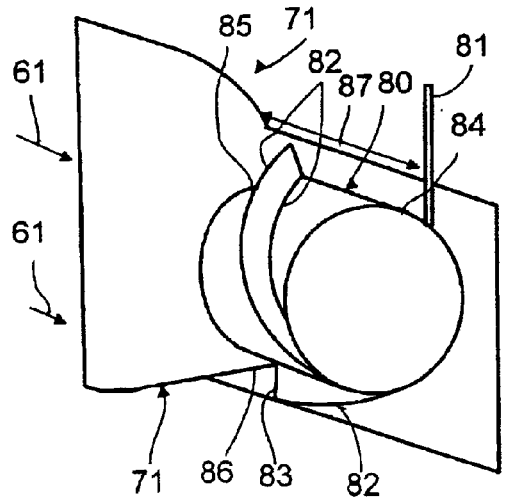
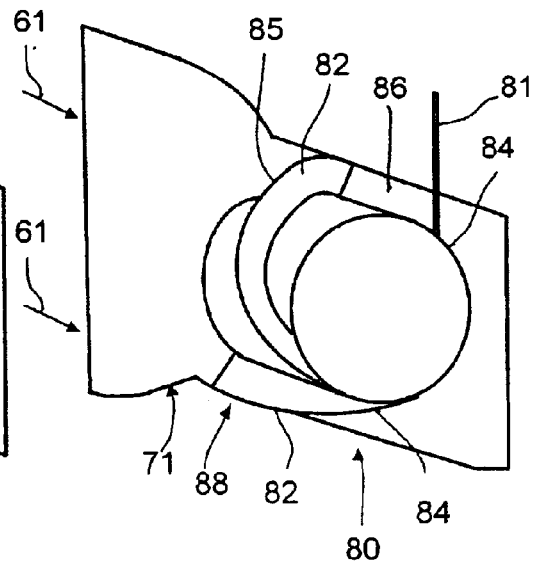

DEVICE FOR FEEDING REACTOR INITIATORS

The present invention relates to an apparatus for feeding initiator into reactors, for instance feeding peroxide into high-pressure reactors for producing LDPE.

Polyethylene (PE) is one of the most important plastics and has a high resistance to aqueous acids and alkalis. The plastic has good electrical properties such as a low dielectric constant and a high specific resistance. Furthermore, this plastic combines good mechanical properties such as a high impact toughness with low densities, which makes it suitable for use in many technical fields. Thus, films and consumer articles for domestic and industrial use are produced from PE; polyethylene is also employed for cable insulation and pipe sheathing. Low density polyethylene (LDPE) has a high transparency because of its low crystalline content of only 50–70% compared to high density polyethylene (HDPE) in which the crystalline content is 70–90%, and this favors its use as a film material. A widely used method of producing polyethylene films is calendering, by means of which polyethylene films having thicknesses in the range from 0.05 to 1 mm can be produced. In calendering, the thermoplastic is rolled out between many rolls between which the thermoplastic is molded to form an ever thinner film. After leaving the calender, the film is cooled on cooling rolls and subsequently rolled up.

One process for preparing LDPE is the tube reactor process. At the beginning of the polymerization, peroxide initiators are introduced in liquid form into the tube reactor. Compared to the amount of ethylene, the mass flow of the peroxide initiator is only small. A property of the initiator used is that it quickly decomposes into free radicals under the conditions prevailing in the tube reactor. To achieve a high effectiveness of these initiators, for example peroxide, so as to ensure a high conversion, improved polymer properties and more stable reactor operation, it is advantageous to mix the reactants with one another very quickly.

EP 0 980 967 discloses a process for preparing ethylene homopolymers and copolymers in a tube reactor at pressures above 1000 bar and temperatures in the range from 120° C. to 350° C. by free-radical polymerization. Small amounts of free-radical initiators are firstly introduced into a flowing medium comprising ethylene, molar mass regulators and optionally polyethylene, after which polymerization occurs. According to this process, the flowing medium is firstly divided into two volume elements flowing separately from one another and the separately flowing volume elements are then set into relative contrarotation by means of suitable flow-directing elements. The contrarotating, flowing volume elements are subsequently recombined to form a flowing medium and at the time of or shortly after the combination of the contrarotating, flowing volume elements, the free-radical initiator is introduced into the sheared boundary region between the contrarotating flowing volume elements. EP 0 980 967 also discloses an apparatus for carrying out this process. An improvement in mixing of the initiator metered in and, associated therewith, an improvement in the product quality was also able to be achieved by increasing the flow velocity in the mixing zones.

The effectiveness of the free-radical initiator chosen depends on the rapidity with which it can be mixed with the reaction medium initially present in an individual case. For this purpose, injection fingers are used in industrial plants for the production of polyethylene.

EP 0 449 092 A1 describes the introduction of free-radical initiators, initiator mixtures or solutions of initiators in organic solvents via injection fingers at a plurality of points along a reactor.

U.S. Pat. Nos. 4,135,044 and 4,175,169 describe how a comparatively small tube diameter in the initiation and reaction zones of a high-pressure reactor, relative to the enlarged tube diameter in the cooling zone, makes it possible to produce products having very good optical properties in high yields and at a relatively small pressure drop over the length of the reactor.

Finally, U.S. Pat. No. 3,405,115 disclosed that uniform initiation of the polymerization reaction and optimum mixing of the reaction components are of great importance for the quality of the polyethylene obtained, for high reactor yields and for achieving uniform reactor operation. According to this solution, initiators are mixed with substreams of cold ethylene in a special mixing chamber and only then are introduced into the actual reactor. In the mixing chamber, the fluid in which the initiator does not decompose because of the low temperatures prevailing there is multiply diverted and passed through channels.

It is an object of the present invention to further optimize the introduction of a free-radical initiator into a flowing medium so as to give as high a mixing speed as possible.

We have found that this object is achieved by a process for preparing polyethylene in tube reactors and/or in combination with autoclaves, in which a free-radical initiator is introduced into a flowing ethylene- and possibly comonomer-containing medium and which comprises at least the following steps:

generation of rotation by mixing two streams to be mixed at an angle or generation of rotation in the flowing medium by means of swirl elements, provision of a cross-sectional constriction with an inlet zone upstream of the feed point for a free-radical initiator into a reaction tube, introduction of the free-radical initiator into the rotating flow of the flowing medium and provision of a downstream mixing zone and a cross-sectional widening with an outlet.

The particular advantage of the method according to the present invention is that a more sparing introduction of free-radical initiator can be achieved by increasing the effectiveness of mixing. The generation of rotation in the flowing medium increases the turbulence which results per se in an improvement in the effectiveness of mixing by means of transverse impulse exchange in the fluids to be mixed. The process according to the present invention makes it possible to prepare polyethylenes which can be used to produce films having significantly improved optical properties, specifically in respect of transparency, because of lower proportions of high molecular weight material. The solution provided according to the present invention and the rapid mixing of the polyethylene-containing flowing medium with the free-radical initiator enables significantly more stable reactor operation at extraordinarily high maximum temperatures to be achieved without the final product tending to decompose. Furthermore, a faster temperature rise in the reactor and a better low-temperature initiation behavior of the polymerization when using initiators which decompose at low temperature can be achieved. A further advantage of the process according to the present invention is the extremely short mixing-in time compared to the half-life of the initiator.

In a further embodiment of the idea underlying the invention, the feed point for the free-radical initiator is located downstream of the point at which rotation is generated in the flowing medium. This ensures that the free-radical initiator fed into the flowing medium at the feed point always enters a flowing medium which is already in a turbulent state, so that the mixing time is reduced and the effectiveness of mixing is significantly improved.

The geometry of the feed orifice of the element for feeding the free-radical initiator into the rotating, flowing medium makes it possible to influence the depth to which the free-radical initiator is injected into the flowing medium. If the introduction orifice for the free-radical initiator on the injection finger is made particularly small, a fine jet of the free-radical initiator can be injected very deep, relative to the tube cross section, into the flowing medium. Depending on the flow velocity of the flowing medium, the injection depth of the free-radical initiator and thus the achievable effectiveness of mixing can be positively influenced and matched by means of the geometry chosen for the feed orifice.

In one embodiment of the process according to the present invention, the feed devices for substreams of the flowing medium are at an angle of 90° to one another. This enables a tangential flow component to be generated in the resulting stream of the flowing medium and this flow component generates circumferential rotation in the combined stream of the flowing medium, which is desirable for achievement of turbulent flow. Before the substreams of the flowing medium are combined at an angle of 90° to one another, they can each pass through cross-sectional constrictions so that the flow velocity can, depending on the ratio of the free to constricted flow cross section, be doubled. If the substreams of the rotating flowing medium are combined within the reaction tube, a further increase in the turbulence of the combined flowing medium can be achieved by provision of a further cross-sectional constriction upstream of the feed point for the free-radical initiator after passage through an annular space.

The introduction of the free-radical initiator at the feed point is preferably into a shear gap of the rotating flowing medium which rotates in the circumferential direction in the flow cross section relative to the position of the feed point for the free-radical initiator.

Another variant of the generation of a rotating flow comprises providing swirl elements in the free flow cross section over which the flowing medium passes and by which the flowing medium is set into rotation in the circumferential direction in the flow cross section, so that shear gaps arise.

Rotation in the flowing medium can be generated, on the one hand, in such a way that a core stream is surrounded on its imaginary cylindrical outer surface, i.e. the shear surface, by an annular stream which has been set into rotation relative to the core stream. The annular stream surrounding the core stream can rotate either clockwise or anticlockwise around the core stream. On the other hand, it is also possible to make the core stream rotate and to generate rotation opposite to the rotation of the core stream in a stream surrounding the core stream.

The object of the present invention is also achieved by an apparatus for preparing polyethylene in tube reactors, in which a free-radical initiator is fed into a flowing ethylene- and possibly comonomer-containing medium and the flowing medium is conveyed through a reaction tube having a changing flow cross section and a free-radical initiator is introduced in a mixing region of the reaction tube and either substreams of the flowing medium impinge on one another at a particular angle or swirl-generating elements are located in the flow cross section, with a feed element having an off-center inlet orifice for a free-radical initiator being located downstream of a constriction in the rotating flow.

The apparatus according to the present invention for preparing polyethylene is given tremendous mixing effectiveness by the free-radical initiator being fed into shear gaps of a rotating flow, which have not only an axial flow component but also flow components in the circumferential direction. Flow components in the circumferential direction effect impulse exchange transverse to the flow direction and thus provide the basis for effective mixing of a plurality of materials.

In a preferred embodiment of the apparatus of the present invention, the outlet orifice at the tip of the feed element, which is configured as a flow-favorable injection finger is preferably inclined at 45° to the axis of the finger. Depending on the cross-sectional diameter of the orifice, any angles in the range from 0° to 90° are possible. The swirl elements which are located in the free flow cross section in the reaction tube have, on their outer circumference, swirl blades which extend over an annular space of the reaction tube by in each case about 90° in the circumferential direction. In an alternative embodiment of a swirl element, the swirl blades are arranged on its outer circumference so that they extend over an annular space of the reaction tube by in each case about 120° in the circumferential direction.

A further improvement in the mixing effectiveness can be achieved by the flow diameter in the region of the feed point for free-radical initiator being reduced to about 70% of the free flow diameter. This enables the flow velocity to be increased by a factor of 2, which likewise makes a great contribution to the effectiveness of mixing.

To avoid "deadwater" regions, the transition from the free flow cross section upstream of the constriction to the latter forms a total angle of from 20° to 40°, so that an abrupt transition is avoided. The total angle is particularly preferably 30°. To improve the mixing behavior, the diameter of the constriction downstream of the feed point for the free-radical initiator is maintained over a mixing section length of from about 10 to 20 tube diameters (D). After this mixing section of from 10 to 20 tube diameters (D), the mixing section then widens at a total angle of less than 20° back to the free flow cross section. To prevent demixing phenomena in the transition from the narrower flow cross section to the wider flow cross section as a result of the decrease in the velocity, the total angle is preferably less than 14°, so that a gradual transition from the mixing section cross section of 0.7×D to D occurs.

The invention is described in more detail below with the aid of the drawing.

Figure 2:
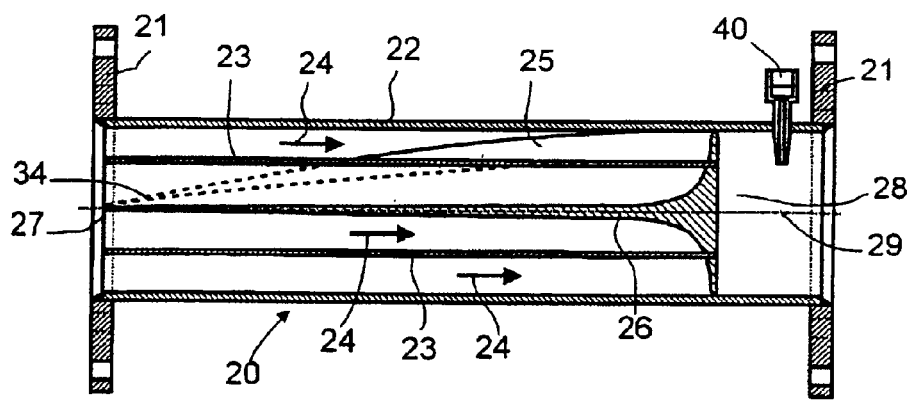
Figure 3:
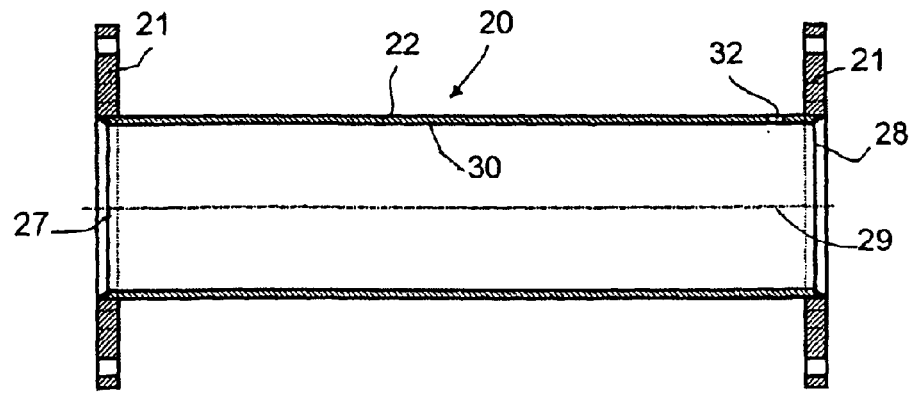
Figures 1, 4:
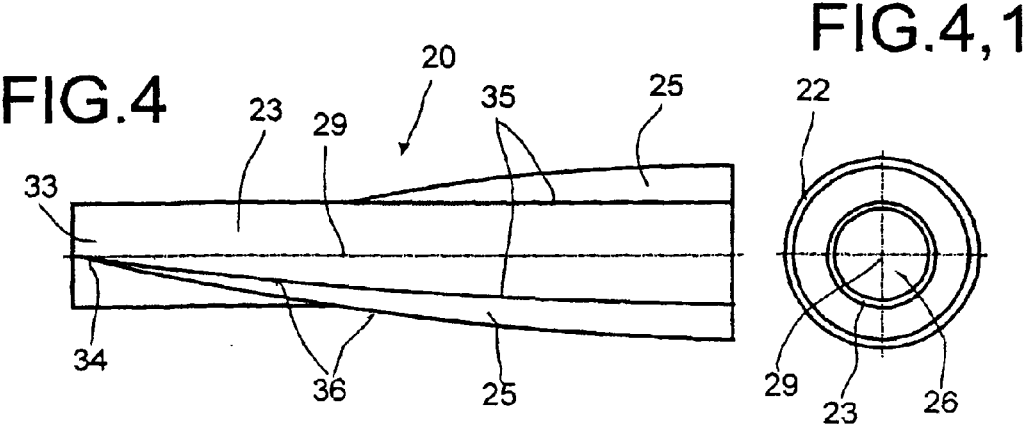
Figures 1, 5:
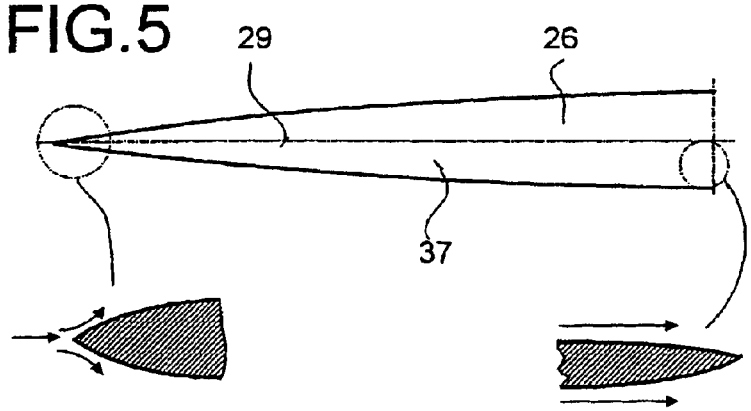
Figure 6:
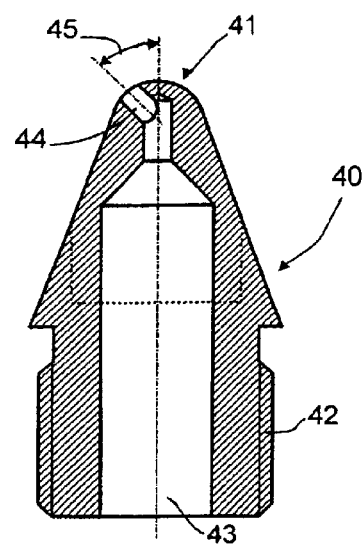
Figure 6:
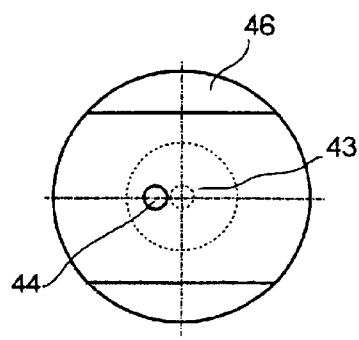
Figure 7:
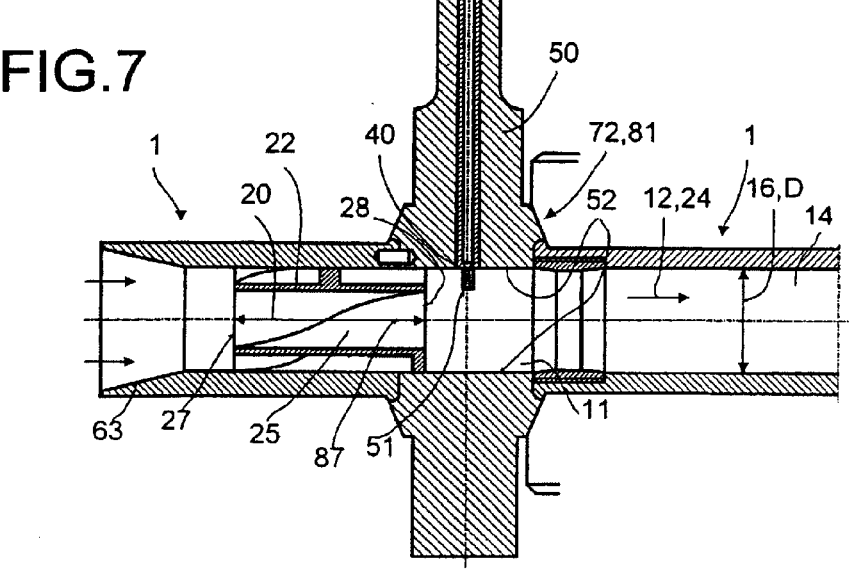

In the drawing,

FIG. 1 shows an in-principle sketch of a mixing section with mixing region and injection point for a free-radical initiator FIG. 2 shows a swirl-generating component, FIG. 3 shows a casing of the swirl element, FIGS. 4 and 4.1 show an exterior swirl element, FIGS. 5 and 5.1 show an interior swirl element, FIGS. 6 and 6.1 show a flow-favorable injection finger, FIG. 7 shows an injection point for a free-radical initiator located downstream of a swirl generator and upstream of a mixing section, FIG. 8 shows a T-shaped connecting piece, FIGS. 9, 9.1 and 9.2 show swirl-generating internals in flow cross sections with 90° and 120° blade configurations upstream of the injection of a free-radical initiator.

FIG. 1 depicts an in-principle sketch of a mixing section with mixing region and a feed point for a free-radical initiator.

The reaction tube 1 depicted in the schematic diagram of FIG. 1 can be part of a tube reactor in which polyethylene LDPE is prepared by the process proposed according to the present invention. The reaction tube 1 has an inlet cross section 2 and an outlet cross section 3. On the inlet side, the reaction tube 1 is connected via a line system with a system for supplying reactants. Both a stream comprising fresh gas and the unreacted monomer recirculated via the high-pressure return circuit are fed into the mixing vessel 4 as fluctuation damper with buffer. A throttle element 5 can be located upstream of the mixing vessel. Downstream of the mixing vessel 4, the reactant feed line is provided with a compressor 6 by means of which the reactants, i.e. the flowing medium going to the reaction tube 1, are compressed.

In the feed region 11, a free-radical initiator is fed via a free-radical initiator inlet line 7 into the interior of the reaction tube 1. For this purpose, a feed line system 7 via which a stock 8 of a free-radical initiator is supplied via a throttle element 9 and via a compressor 10 located downstream thereof to the feed point at which the free-radical initiator, which initiates the polymerization reaction, is introduced into the flowing medium in the reaction tube 1 is provided. The feed region 11 is followed in the flow direction 12 by a mixing region 13 which preferably has a length of from 10× to 20× the diameter (D) of the reaction tube 1. The flowing fluid medium which is mixed in the manner indicated below with the free-radical initiator introduced in the feed region 11 passes through the mixing section 14.

The flow cross section of the reaction tube 1 is denoted by reference labels 16 or D. The outlet end 3 of the reaction tube 1 is adjoined by a pressure maintenance valve 15 by means of which the reaction mixture obtained is depressurized. This results in phase separation.

In industrial plants for preparing LDPE, the pressure maintenance valve 15 shown in the in-principle sketch of FIG. 1 serves as response valve and regulating valve. By means of this valve and a downstream high-pressure separator 19.1, part of the flowing, ethylene-containing medium is, on an industrial scale, returned after cooling to the plant via a high-pressure circuit 19.3 and the LDPE obtained is passed to a high-pressure separator 19.1 from which the product 19.2 is subsequently taken off.

In industrial plants, the reaction tube 1 of a tube reactor is provided in the mixing region 13 and in the following mixing section 14 with wall cooling 18. The wall cooling 18 is usually configured as a cooling jacket which removes part of the heat of reaction evolved in the polymerization reaction between the flowing medium and the free-radical initiator. The remainder of the heat of reaction remains in the flowing medium. In addition, when the process of the present invention is employed on an industrial scale, in which case a plurality of reaction tubes 1 each forming a reaction stage may be connected in series, the mixing sections 14 can each be provided with cold gas inlet lines 17a, 17b. Mixing-in a cold gas stream at the beginning of the mixing sections 14 allows a further part of the heat evolved in the polymerization reaction to be compensated in the flowing mixture of flowing medium and free-radical initiators, which is relevant to the conversion. Furthermore, the free-radical initiator can be introduced into the cold gas stream 17b via the pump 10.

FIG. 2 shows a more detailed view of a swirl-generating component which can, for example, be installed in the reaction tube 1 shown schematically in FIG. 1.

The swirl element 20 depicted in FIG. 2 is accommodated in an outer tube 22. The outer tube 22 in turn encloses an inner tube 23. On the outside of the inner tube 23 there are located, as shown schematically in FIG. 2, swirl-generating exterior blades 25 whose swirl blade area 36 decreases in the direction of the outlet cross section 28 of the swirl element 20. 2, 3, 4 or more exterior swirl blades 25 can be located opposite one another on the outer circumference of the inner tube 23. The interior of the inner tube 23 can, as shown in the embodiment in FIG. 2, be provided with an interior swirl blade 26. This gives the part of the stream passing through the interior cross section of the inner tube 23 a rotational motion for generating turbulent flow, while the part of the fluid medium passing through the annular space between inner tube 23 and outer tube 22 is provided with a flow component in the circumferential direction by means of the 2, 4 or more exterior blades 25 located on the outer circumference of the inner tube 23. At the outlet cross section 28 in the region of the points 34 of the swirl blades there is accordingly a rotating flow having a circumferential component relative to the center line 29.

FIG. 3 shows a casing of the swirl element depicted schematically in FIG. 2.

The casing of the swirl element 20 consists essentially of the outer tube 22 which is located between two flanges 21. The inlet cross section 27 is parallel to the outlet cross section 28 of the swirl element 20 coaxial with the center line 29. The inner wall 30 of the outer tube 22 represents the outer boundary of an annular gap which is formed between the outer surface of the inner tube 23 and the outer tube 22 and through which the exterior blades 25 which are fastened to the external circumference of the inner tube 23 pass in a screw-like fashion.

FIGS. 4 and 4.1 show an inner tube 23 provided with exterior blades located opposite one another on the circumferential surface in greater detail.

The exterior blades 25 of which, in the embodiment depicted in FIG. 4, two are fixed opposite one another on the outer wall of the inner tube 23 are attached to the inner tube 23 along a line of attachment 35. The swirl blades 25 extend along the line of attachment 35 on the outer surface of the inner tube 23 in a screw-like fashion, with the screw line chosen here having a high pitch. It is also possible for more than the two exterior blades 25 shown in FIG. 4 to be provided on the exterior wall 33 of the inner tube, for example four or even six blades symmetrically at 90° relative to the center line 29.

FIG. 4.1 shows a plan view of the rear part of the inner tube 23. In FIG. 4.1, the exterior blades 25 on the exterior wall 33 of the inner tube are surrounded by the outer tube 22 of the swirl element 20. In addition, an interior swirl blade 26 which extends in a twisting fashion over a region of at least 90° along the inner wall of the inner tube 23 is provided in the interior of the inner tube. This region can also be up to 180°. It is also possible for a plurality of flow channels to be formed.

FIGS. 5 and 5.1 show a side view of an interior swirl blade 26 and also a rear view thereof. Relative to its center line 29, the interior swirl blade 26 is provided with a twisted interior swirl blade surface 37 which, as can be seen in FIG. 5.1, covers a 90° sector of the inner surface of the inner tube 23.

The screw-like pitches of the exterior blades 25 and the interior blades 26 have the same sense; the exterior blades 25 and the interior blades 26 can be fitted to a swirl element as shown in element 20 of FIG. 2 with different pitches relative to one another. By means of this configuration, the component of the flowing medium flowing through the interior of the inner tube 23 can be given a counterclockwise rotation while the fluid component flowing between the exterior wall 33 of the inner tube and the inner surface 30 of the outer tube 22, i.e. in the annular space, has a clockwise rotation component imparted to it. It can be seen from the details in FIG. 5 that all edges of the exterior and interior swirl blades 25 and 26, respectively, which point in the flow direction or in the direction opposite to the flow are streamlined to avoid eddy formation.

FIGS. 6 and 6.1 show a side view and plan view, respectively, of an introduction element for the free-radical initiators, which is preferably configured as a flow-favorable injection finger.

The introduction element is let into the wall of a reaction tube 1 and is provided with a cone tip 41. The introduction element 40 has a hole 43 which, via a conical narrowing of the cross section, goes over into a constricted hole which is adjoined by an outlet orifice 44 at an angle 45. The angle of the outlet orifice 44 is, for example, 45° to the axis of symmetry of the feed element 40, with an angular range from 0 to 180° being possible, so that an oblique introduction of a free-radical initiator into a flowing medium can be achieved. The depth to which the free-radical initiator penetrates into the rotating flowing medium can be adjusted as a function of the angle and cross-sectional area of the outlet orifice 44 and the flow of the cold gas stream 17, so that the depth to which the free-radical initiator, e.g. peroxide, penetrates into the flowing medium can be set independently of the degree of turbulence generated. At the cone tip 41 of the finger-shaped feed element 40, the outlet orifice 44 for the free-radical initiator is positioned so that its circumference preferably enters a shear gap in the rotating flowing medium. The parameters turbulence and injection depth of the free-radical initiator result in the high effectiveness of mixing in the process proposed according to the present invention and the apparatus for the preparation of polyethylene proposed according to the present invention. The outlet orifice 44 on the cone tip 41 of the feed element 40 is slightly offset from the center line of the feed element 40. When injection is carried out without a cold gas stream 17, the angle is preferably from 0 to 15°. When a cold gas stream 17 is employed, the angle is preferably 45° or can be selected within a range from 30 to 60° to prevent the introduced stream from contacting the wall.

The flow-favorable injection finger 40 whose outlet orifice 44 points in the flow direction of the flowing medium prevents the formation of deadwater regions downstream of it. This advantageously prevents regions in which there are relatively high concentrations of the free-radical initiator forming as a result of eddies in the flow; such high concentrations would otherwise lead to decomposition reactions which have a severe adverse effect on the product quality of the LDPE.

In place of the introduction of the free-radical initiator via the injection finger 40, the initiator can also be introduced by means of a carrier medium. Thus, the free-radical initiator, e.g. peroxide, can be introduced into the flowing medium in the cold gas inlet line 17 which would then have to be run, as shown in FIG. 1, into the injection region 11 of the reaction tube. In place of cold gas as carrier medium for the free-radical initiator, it is also possible to use cold ethylene branched off immediately downstream of the compression stage 6 as carrier gas for the free-radical initiator. If the free-radical initiator is introduced using cold gas as carrier gas, the cold gas and free-radical initiator can be mixed in a mixing chamber and this premixed stream can then be injected into the flowing medium at a constriction, so that, when the introduction orifices and introduction angles are designed appropriately, a high impulse is achieved at the point of introduction.

FIG. 7 shows an injection point for a free-radical initiator, which is located downstream of a swirl-generating element and upstream of a mixing section.

A swirl element 20 with exterior swirl blades 25 is assigned to an orifice 51 which projects into a constricted flow cross section and through which a free-radical initiator is introduced into the flowing medium. The exterior swirl blades 25 are located on the outer tube 22 of the swirl element 20 which has a length 87, preferably from about 1 to 3×D. The swirl element 20 imparts a rotation to the flowing medium which, after passing through a constricted cross section, enters the injection region 11 for the free-radical initiator at an accelerated velocity.

In the embodiment shown in FIG. 7, the orifice 51 is at the end of a tube 53 which is surrounded by a lens-shaped body 50 which is accommodated between two sections of the reaction tube 1. Due to the pressure of the free-radical initiator, it is injected into the flowing medium without contacting the inner wall 52 in the mixing region 11 of the reaction tube. After injection of the free-radical initiator into the medium flowing in the flow direction 12, 24, the reacting mixture enters a mixing section 14 which can be followed by a widening of the flow cross section not shown here.

In place of a feed point for pure free-radical initiator 72, 81, the initiator can, in the embodiment shown in FIG. 7, also be introduced by means of a carrier medium, either cold gas 17 or an ethylene stream branched off upstream of the compression stage 6 (FIG. 1). The finger-shaped configuration of the introduction element 40 results in being formed no deadwater regions being formed downstream in the mixing region 11, so that flow regions having a relatively high free-radical initiator concentration do not occur.

FIG. 8 shows a T-shaped connecting piece on a reaction tube in which two reactant streams are mixed with one another.

On the reaction tube shown in FIG. 8, a first substream 61 and a second substream 62 flow to an introduction point on the reaction tube at an angle 66. The first substream 61 of the reactant present as a flowing medium passes through a first cross-sectional constriction 63 which is configured as a conical constriction 64 on the reaction tube. At an angle of 90° thereto, the second substream 62 of reactants flows downward in a vertical direction through a conical section 67 toward the reaction tube. Both substreams of the reactants present as flowing media experience acceleration during passage through the respective cross-sectional constrictions 63 and 67 before the second reactant stream experiences a deflection 66 of 90° and accordingly generates a tangential flow 69. The tangential flow 69 occurs in the circumferential direction relative to the flow direction of the first substream 61, within an annular space 68 in the reaction tube 1. The substreams 61, 62 of the reactant experience, due to the combination at an angle of 90°, mixing by introduction of a tangential flow component 69 into the fluid flowing along the reaction tube.

The fluid from the substream 62 in the annular space 68 in the reaction tube flows along the annular space 68 between the inner wall of the reaction tube and the outer wall of an insert element 65 and is combined with substream 61 at the end of the insert element 65. The combined stream passes the feed point 72 for the free-radical initiator, e.g. peroxide, and a further cross-sectional constriction 71. The cross-sectional constriction 71 is preferably configured so that the free flow cross section at the feed point 72 for the free-radical initiator, for example peroxide, is preferably 0.7×D (free tube diameter). As a result, the rotating, accelerated and combined stream 70 made up of the substreams 61 and 62 of the reactant is subjected to further acceleration. If the feed point 72 for the free-radical initiator on the tube wall is configured as a finger-shaped, flow-favorable injection element 40 as shown in FIGS. 6 and 6.1, a free-radical initiator is preferably introduced at shear gaps into the rotating flow provided with a tangential flow component 69 so that rapid and effective mixing of the combined reactant stream is achieved. The total angle at which the cross-sectional constriction 71 goes over from the original flow cross section D to 0.7×D is in the range from 20° to 40°, particularly preferably a total angle of 30°.

The mixing section which follows the feed point 72 for the free-radical initiator preferably has a length of from 10×D to 20×D (D=tube diameter), but can also be 100×D, before there is, after the mixing section, a transition to the original flow diameter D. The transition from the mixing section diameter of 0.7×D to D preferably has, similar to a diffuser configuration, a total angle of from 10 to 20°, particularly preferably a total angle of less than 14°.

Another embodiment of the apparatus proposed according to the present invention for the preparation of polyethylene is shown in FIGS. 9.1 and 9.2.

In these embodiments, the reactant stream 61 is conveyed as a single stream to a cross-sectional constriction 41 [sic]. A division into substreams 61, 62 entering at inlet points at an angle to one another is not provided for in this embodiment.

The constriction 71 goes over at a total angle of 30° into a narrowed flow cross section in a manner analogous to the embodiment depicted in FIG. 8. After passage through the constriction 71, the flow cross section in the reaction tube is 0.7×D, which is maintained over the mixing section which follows the feed point 81 for the free-radical initiator. The length of the mixing section is preferably from 10×D to 20×D (D=original reaction tube diameter).

After the constriction 71, at which the flow velocity is increased by a factor of up to 2, swirl elements 80 are installed in the free flow cross section of the reaction tube. The swirl elements 80 are located, based on the flow direction 24, upstream of the feed point 81 for a free-radical initiator such as peroxide. In the embodiment depicted in FIG. 9.1, two swirl blades 82 are located on the outer circumference of the swirl elements 80. In this configuration, the swirl blades each extend 90° around the external circumferential surface of the swirl element 80s, so that a rotation is imparted to the fluid stream which enters at increased velocity. The ends of the swirl blades 82 fitted to the outer surface of the swirl elements 80 touch the inside of the reaction tube 1 which encases the swirl elements 80. The edge 85 of the blades 82 on the outer surface 84 of the swirl elements 80 form a seal so that the fluid passing the swirl element 80 is forced through the annular space between outer surface 84 and inner wall of the reaction tube, thus ensuring generation of a flow component in the circumferential direction during passage past the swirl element 80.

An alternative possible embodiment comprises, as shown schematically in FIG. 9.2, installing a swirl element 80 in the region of the reaction tube downstream of the constriction 71, with the swirl blades 82 fitted to the outer surface 84 of the swirl body 80 now extending 120° around the circumferential surface 84 of the swirl element 80, as indicated by reference numeral 88. In this embodiment of the present invention, too, rotation is imparted to the reactant flow into which a free-radical initiator is to be introduced at the introduction point 81, as a result of which the mixing conditions downstream of the introduction point 31 for the free-radical initiator, e.g. peroxide, are significantly improved. The degree of turbulence can be influenced firstly by the pitch of the swirl blades 82 and by the length 87 of the swirl elements. Secondly, the achievable mixing effectiveness can be optimized by the design of the constriction 71 by acceleration of the reactant stream.

Significant parameters are, apart from the mixing parameters, the length of the mixing zone and the acceleration of the flowing medium.

An aspect common to the embodiments shown in FIG. 8 and FIGS. 9.1 and 9.2 is that firstly the generation of rotation can be carried out on introduction of the substreams 61 and 62 of the reactant, secondly a rotating flow can be achieved by angled combination of the substreams and thirdly rotation can be imparted to the fluid into which a free-radical initiator is to be introduced by means of the swirl element 20, 80 located in the flow cross section. The introduction of the free-radical initiator can be carried out either without or with cold ethylene.

The internals employed according to the present invention for generating rotation can also be retrofitted to existing plants after slight modifications in order to increase their efficiency.

List of Reference Numerals

1 Reaction tube
2 Inlet
3 Outlet
4 Mixing vessel
5 Throttle element
6 Compressor
7 Inlet line for free-radical initiator
8 Initiator reservoir
9 Throttle element
10 Compressor
11 Injection region
12 Flow direction
13 Mixing region
14 Mixing section
15 Valve
16 Flow cross section
17a Inlet line for cold gas
17b Inlet line for cold gas
18 Wall cooling
19 Fresh gas feed
19.1 Separator
19.2 Product
19.3 High-pressure recirculation
20 Swirl element
21 Flange
22 Outer tube
23 Inner tube
24 Flow direction
25 Exterior swirl blade
26 Interior swirl blade
27 Inlet cross section
28 Outlet cross section
29 Center line
30 Interior wall
31 Exterior wall
33 Exterior wall of inner tube
34 Point of swirl blade
35 Line of attachment
37 Surface of interior swirl blade
40 Injection finger
41 Cone tip
42 External screw thread
43 Hole
44 Outlet orifice
45 Angle
50 Injection lens 51 Orifice
52 Interior wall
53 Tube
60 T-piece
61 First stream
62 Second stream
63 Cross-sectional constriction
64 Conical section
65 Insert
66 90° dimension
67 Conical section
68 Annular space
69 Tangential flow
70 Constriction 61, 62
71 Cross-sectional constriction for combined stream
72 Injection of free-radical initiator
73 Shear gap
80 Swirl element
81 Injection of free-radical initiator
82 Swirl blade
83 Extent of swirl blade 90°
84 Outer surface of swirl element
85 Edge of blade
86 Annular space
87 Length of swirl element
88 Extent of swirl blade 120°

We claim:

1. A process for preparing polyethylene in tube reactors and/or in combination with autoclaves, in which a free-radical initiator is introduced into a flowing medium comprising ethylene and possibly comonomers and which comprises at least the following steps:

generation of rotation by mixing two streams to be mixed (61, 62) at an angle (66) or generation of rotation in a stream (61) by means of a swirl element (20), provision of a cross-sectional constriction (63, 67; 71) with an inlet zone upstream of the feed point (72, 81) for a free-radical initiator into a reaction tube (1), introduction of the free-radical initiator through an off-center outlet orifice (44) into the flowing, rotating medium (61, 62; 70) and provision in a downstream direction of a mixing zone and a cross-sectional widening with an outlet.

2. A process as claimed in claim 1, wherein a plurality of reaction tubes (1) are connected in series and their mixing sections (14) are each assigned a main cold gas inlet line (17a).

3. A process as claimed in claim 1, wherein the heat of reaction is removed by means of wall cooling (18) and the introduction of cold gas (17).

4. A process as claimed in claim 1, wherein the free-radical initiator is fed to in injection region (11) by means of a carrier gas, cold gas main stream (17a) or cold substream of the flowing medium which has been branched off before compression.

5. A process as claimed in claim 1, wherein the feed point (72, 81) for the free-radical initiator is located downstream of the point where rotation is imparted to the flowing medium (61, 62).

6. A process as claimed in claim 1, wherein the depth to which the free-radical initiator is injected into the flowing medium (61, 62; 70) can be influenced by the geometry of the outlet orifice (44) on the introduction finger (40).

7. A process as claimed in claim 1, wherein the feed facilities for the flowing medium (61, 62) are at an angle (66) to one another of from 45 to 135°, but preferably 90°.

8. A process as claimed in claim 1, wherein the flowing media (61, 62) each pass through cross-sectional constrictions (63, 67) before they are combined.

9. A process as claimed in claim 1, wherein the rotating, flowing medium (61, 62, 70) passes through a cross-sectional constriction (71) downstream of an annular space (68) before reaching the feed point (72) for the free-radical initiator.

10. A process as claimed in claim 1, wherein the free-radical initiator is fed into a shear gap (73) of the rotating flowing medium (70) at the feed point (72).

11. A process as claimed in claim 1, wherein the rotation in the flowing medium (61, 62, 70) is generated by means of swirl elements (20, 80) located in the flow cross section (27, 28) up-stream of the feed point (72, 80).

12. An apparatus for preparing polyethylene in tube reactors, in which a free-radical initiator is fed into a flowing ethylene- and possibly comonomer-containing medium (61, 62) and the flowing medium (61, 62) passes through a reaction tube (1) having a changing flow cross section (27) and a free-radical initiator is introduced in a mixing region (13), wherein substreams (61, 62) of the flowing medium impinge on one another at an angle (66) or swirl elements (20, 80) are located in the flow cross section (27, 28) and a feed finger (40 having an off-center outlet orifice (44) for a free radical initiator is located downstream of a constriction (71) in the rotating flow (70).

13. An apparatus as claimed in claim 12, wherein the outlet orifice (44) at the tip (41) of the feed finger (40) is inclined to the axis of the latter at an angle of from 5 to 80°.

14. An apparatus as claimed in claim 12, wherein the swirl elements (20, 80) are provided on their outer circumference with swirl blades (25, 82) which each extend over from 45 to 360°, in the circumferential direction in an annular space (68) of the reaction tube (1).

15. An apparatus as claimed in claim 12, wherein the swirl elements (20, 80) are provided on their outer circumference with swirl blades (25, 82) which each extend over from 45 to 360°, in the circumferential direction in an annular space (68) of the reaction tube (1).

16. An apparatus as claimed in claim 12, wherein the diameter of the constriction (71) is from about 0.2 to 0.95 times, the diameter D of the free flow cross section (27, 28).

17. An apparatus as claimed in claim 12, wherein the free flow cross section (27) upstream of the constriction (71) goes over at a total angle of from 10° to 70° into the constriction (71).

18. An apparatus as claimed in claim 17, wherein the total angle is 30°.

19. An apparatus as claimed in claim 12, wherein the diameter 0.7×D of the constriction (71) downstream of the feed point (71, 82) for the free-radical initiator remains unchanged over a mixing section length (13) of from 10×D to 100×D.

20. An apparatus as claimed in claim 12, wherein the mixing section (13) goes over after from 10×D to 100×D into the free flow cross section diameter D at a total angle of less than 20°.

* * * * *

UNITED STATES PATENT AND TRADEMARK OFFICE
CERTIFICATE OF CORRECTION

PATENT NO.    : 6,951,908 B2
DATED         : October 4, 2005
INVENTOR(S)   : Georg Groos et al.

It is certified that error appears in the above-identified patent and that said Letters Patent is hereby corrected as shown below:

Column 12,
Line 29, "feed finder (40 having an off-center outlet orifice (44) for a" should read -- feed finder (40) having an off-center outlet orifice (44) for a --.
Line 32, "13. An apparatus as claimed in claim 12, wherein the" should read -- 13. An apparatus as claimed in claim 30, wherein the --.
Line 35, "14. An apparatus as claimed in claim 12, wherein the swirl" should read -- 14. An apparatus as claimed in claim 30, wherein the swirl --.
Line 40, "15. An apparatus as claimed in claim 12, wherein the swirl" should read -- 15. An apparatus as claimed in claim 30, wherein the swirl --.
Line 45, "16. An apparatus as claimed in claim 12 wherein the" should read -- 16. An apparatus as claimed in claim 30 wherein the --.
Line 48, "17. An apparatus as claimed in claim 12, wherein the free" should read -- 17. An apparatus as claimed in claim 30, wherein the free --.
Line 52, "18. An apparatus as claimed in claim 17, wherein the total" should read -- 18. An apparatus as claimed in claim 35, wherein the total --.
Line 54, "19. An apparatus as claimed in claim 12, wherein the" should read -- 19. An apparatus as claimed in claim 30, wherein the --.
Line 59, "20. An apparatus as claimed in claim 12, wherein the" should read -- 20. An apparatus as claimed in claim 30, wherein the --.

Signed and Sealed this

Thirty-first Day of January, 2006

JON W. DUDAS
*Director of the United States Patent and Trademark Office*